March 30, 1937.  K. A. GERSON  2,075,193
PROCESS FOR THE TREATMENT OF GASEOUS FLUIDS
Filed Aug. 18, 1934
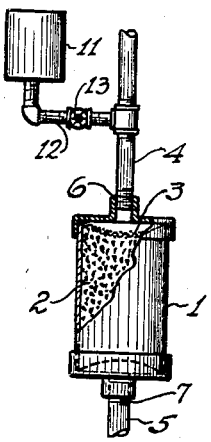
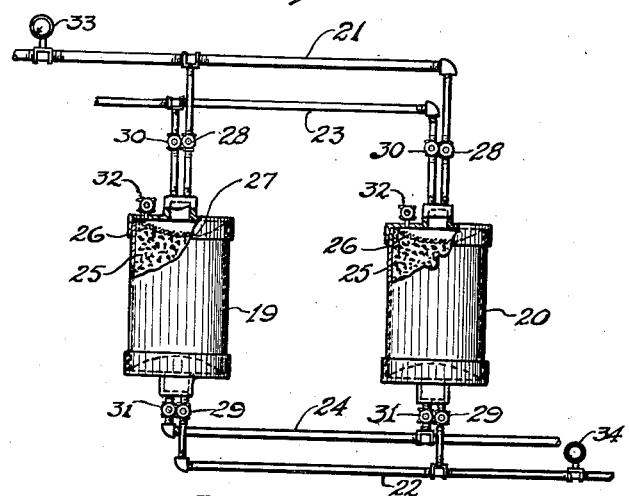
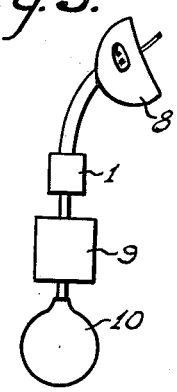
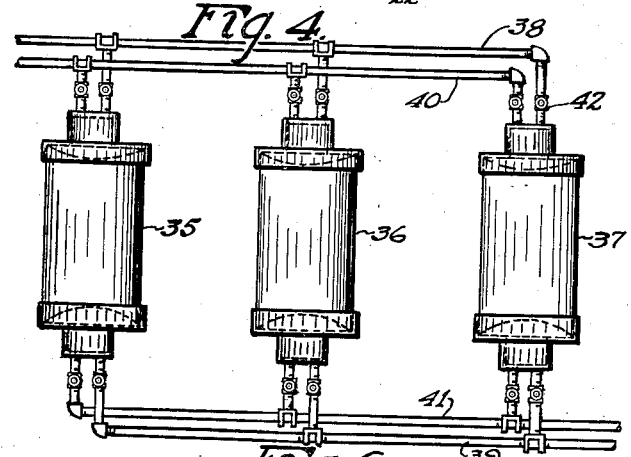
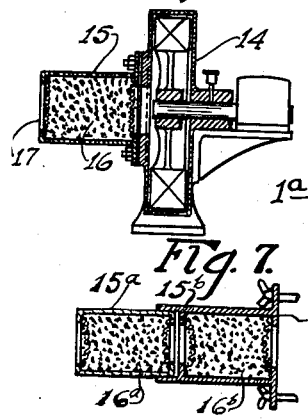
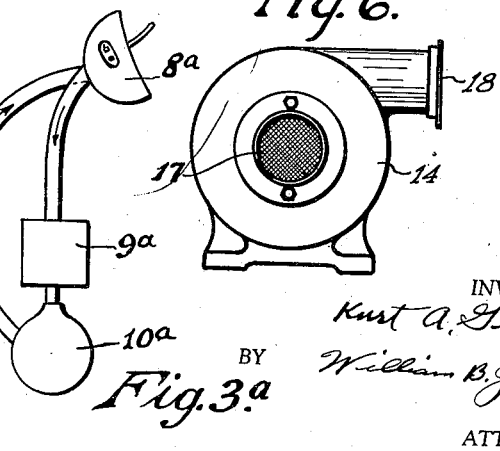
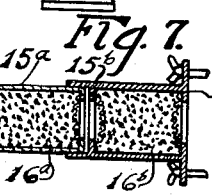
INVENTOR.
Kurt A. Gerson
BY William B. Jaspert
ATTORNEY.

Patented Mar. 30, 1937

2,075,193

UNITED STATES PATENT OFFICE 2,075,193

PROCESS FOR THE TREATMENT OF GASEOUS FLUIDS

Kurt A. Gerson, Kilburn, London, England

Application August 18, 1934, Serial No. 740,483

13 Claims. (Cl. 128—191)

This invention relates to new and useful improvements in the art of treating gaseous fluids, and it is among the objects thereof to provide a method for cooling and moistening air, vapors, and gases in a simple and economical manner.

Another object of the invention is the provision of means for chemically treating gaseous fluids such as air, vapors and gases, as a step in lubricating, disinfecting, and extracting or other processes as will be hereinafter explained.

A further object of the invention is to utilize materials that are available in commercial bulk, thus rendering the method of treating inexpensive, particularly in view of the fact that the substance employed is not consumable and under ordinary circumstances will not require replacement.

It is known that certain, especially mineral, substances possess a surface in consequence of their very fine porous structure, which is a multiple of that of a non-porous body of the same shape. Such substances are, for instance, pumice, silica gel, infusorial earth, activated coal, etc. I have discovered that such materials possess the property of absorbing moisture largely and of giving it off slowly and uniformly, which is obviously the result of their special porous structure.

Furthermore, all the above-mentioned substances are hygroscopic and retain for instance the moisture of the atmosphere by their finest canals acting as capillary pipes. Pumice, for example, when exposed to the atmosphere takes up a certain quantity of moisture, giving it off to a change into drier surrounding atmospheric conditions.

These properties I apply for the cooling and moistening of air, vapors and gases, and consequently also for the distribution of chemicals into air, vapors and gases.

The useful application of these porous materials for the practice of the above stated objects will become more apparent from a description of the accompanying drawing constituting a part hereof, in which like reference characters designate like parts and in which:

Figure 1 is a front elevational view, partially in section, of a container or cartridge charged with porous material and connected in a gaseous flow passage for the treatment of vapors.

Figure 2 a similar view showing the use of such cartridges in multiple for specific applications;

Figure 3 a view diagrammatically illustrating the application of the invention to oxygen breathing apparatus of the pendulum type;

Fig. 3a is a view diagrammatically illustrating the application of the invention to oxygen breathing apparatus of the circular breathing type;

Figure 4 a front elevational view illustrating the use of three cartridges in the treatment of gaseous fluids;

Figure 5 a vertical section of a blower and a cartridge for the adaption of the process to air conditioning systems;

Figure 6 a side elevational view of the structure shown in Figure 5; and

Figure 7 a cross-section showing an arrangement of a plurality of cartridges in tandem relation for a purpose to be hereinafter described.

With reference to the drawing, the structure of Figure 1 is applicable for use in air cooling and moistening processes and may be better described in connection with an actual test, as follows: A container 1 of two-and-three-eighths inches diameter and two-and-three-eighths inches long was filled with granulated pumice 2 of a size between six and fourteen mesh screen, the pumice being retained in the container 1 by screens 3 that are concave in shape to cause an equal distribution of the air flowing through pipe lines 4 and 5, the pipe being hermetically sealed at the joints 6 and 7 so that air flowing from the pipe 4 through the container will intimately contact the granular pumice 2. Before placing the container 1 in the pipe line as shown, it was submerged in water and then carefully drained of any free water, the pumice being thus thoroughly moistened.

The room temperature was 66° F. (saturation 45%) and before passing air through the conduit 4 to the container 1 it was heated to 131° F. It was then passed through the pumice at a rate of flow of thirty litres per minute and the temperature of the air leaving the container through conduit 5 was reduced to 64.4° F. and maintained constant for approximately one and one-half hours. The temperature of the air increased when the evaporation of the water retained in the pumice was completed and then became 131° F. the same as the admission temperature. The resistance of the container was 0.12 inch of water column and the cooled air was moist.

The foregoing illustration demonstrates a fifty percent drop in the temperature of the heated air passing through the container, the temperature drop being maintained constant for a substantial period of time, thus rendering the invention useful without any auxiliary equipment, as for example, in its application to oxygen breathing apparatus, as shown in Figure 3, in which the container 1 is connected between a mask or mouthpiece 8 and a self contained oxygen evolving container or cartridge 9 which is in turn connected to a respirator bag or lung 10. The arrangement illustrated is known as pendulum breathing in that upon inhalation the air leaves the bag 10, passes up through the cartridge 9, through the container cooler 1 and into the mask 8. Upon exhalation the air leaves the mask 8, passes down through container cooler 1, through revivifying cartridge 9 and into the bag 10 which serves as a reservoir for the respired air. The bag 10 is constructed so that it expands or contracts in conformity with the exhalation and inhalation of the wearer of the equipment and without imposing too great a resistance to breathing.

Fig. 3a illustrates a circular type oxygen breathing apparatus including a mask or mouthpiece 8a, connected to a revivifying and oxygen evolving cartridge 9a in turn connected to a respirator bag or lung 10a. The bag 10a is connected by a return or inhaling conduit R with the mask 8a, and the return conduit carries the container cooler 1a. In the operation of this type of apparatus the air leaves the mask 8a and returns thereto by way of conduit R, all as indicated by the arrows. This operation as effected by one-way valves is well understood by those skilled in the art. The adaptation of the cooling and moistening containers 1 and 1a to oxygen breathing apparatus is important as it enables the wearer to inhale moistened and cooled air independent of the reaction temperature in the oxygen evolving containers 9 and 9a.

For other uses of moistened and cooled air the pumice in the cartridge 1 may be kept moist by supplying the moisture from a storage container 11, Figure 1, which is connected by a pipe 12 to the conduit 4, the supply of liquid to the conduit being controlled by a valve 13. In the use of the water supply, the pumice in the container is originally completely moistened, as previously described, and is kept in the moistened state by supplying a very light flow or drip of the liquid through the valve 13, the resulting liquid being entrained in the air flow to the container 1 to maintain a constant moist condition of the pumice. This arrangement can be used where it is desired to provide an uninterrupted supply of moistened and cooled air.

Another method of applying the invention to air conditioning systems is shown in Figures 5 to 7 of the drawing, wherein a blower, generally designated by the reference numeral 14, is provided with a container 15 charged with the porous granular material 16, such as pumice, the container being open at 17 to the atmosphere which constitutes the intake passage of the blower. The outlet passage is designated by the numeral 18 in Figure 6 of the drawing.

The material in the container 15 is maintained in a moist condition as hereinbefore described, and air drawn through the substance is cooled and moistened and transmitted through the outlet passage 18 to a distributing system which may be the ventilating system of a building or dwelling.

The invention is also useful for supplying dry cooled air or gases by the arrangement shown in Figure 7: A container 15b is filled with a suitable drying medium 16b, and is attached to the blower 14. A second container 15a is attached to container 15b and is filled with pumice 16a. The pumice is moistened to cool the air drawn into the blower and the drying agent, such, for example, as calcium chloride, dries the cooled air.

In the construction shown in Figure 2, a pair of containers 19—20 is connected in parallel to pipe lines or conduits 21—22 and 23—24, the containers being charged with the highly porous granular material 25 and provided with the usual screens 26. The conduits are connected to the end caps 27 of the containers and are provided with valves 28, 29, 30 and 31, valves 28—29 control the flow through conduits 21—22 and the valves 30—31 through conduits 23—24. The containers 19—20 are also provided with valves 32 and thermometers 33—34 are connected in the air lines 21—22.

By this arrangement, moistened and conditioned air can be continuously supplied through conduit 22 by passing it from the conduit 21 through either of the containers 19 or 20, while the other container is being recharged with the moistened liquid. For example, if the container 20 is in use, valves 28 and 29 will be open and valves 30, 31, and 32 closed, permitting the air to flow from conduit 21 through the moistened material 25 to the outlet conduit 22. At the same time, the granular material 25 in container 19 is being conditioned by supplying a liquid from conduit 23 in the following manner: Valves 28—29 are closed; valves 30—31—32 are open, causing liquid to flow from the container 23 through the granular substance 25 to the drain line 24. The object of valve 32 is to permit the escape of air which is displaced by liquid entering the container 19 and when the material 25 has been sufficiently charged with the moistening liquid, valve 32 is again closed. The condition of the granular material can be readily determined by the thermometers 33—34 to connect or disconnect the containers in the air flow line.

This arrangement is also suitable and useful for chemically treating air or gases by supplying alcohol, glycerine, benzol or other liquids instead of water through the supply line 23. In this manner an admixture of alcohol, glycerine, formaldehyde, etc. in hot dry vapors is attainable for use in supplying chemically treated vapors where needed.

Alcohol, for example, may be injected into a steam line as a useful means of lubricating turbines to prevent corrosion while formaldehyde may be entrained in air or steam as a disinfectant, and benzol or other extracting media may be entrained in steam for extracting oils and the like.

Figure 4 shows a similar arrangement to that of Figure 2, wherein three containers 35, 36, and 37 are connected to an air or steam line 38 and a supply line 39, and also to a liquid supply line 40 and drain line 41, valves 42 being provided in the connecting pipes to control the flow of the gases or liquid fluids as described in connection with Figure 2 of the drawing.

The degree of moistening or liquid saturation and the degree of cooling may be readily controlled by suitably dimensioned containers filled in the indicated manner to obtain positive control of temperature and humidity.

From the foregoing description of the invention it will be apparent that the principle is applicable for the cooling and moistening of air, vapors and gases and consequently also for the distribution of chemical liquids into air, vapor and gases in a large and varied field.

Although several embodiments of the invention have been herein illustrated and described, it will be obvious to those skilled in the art that various modifications may be made in the details of construction without departing from the principles herein set forth.

I claim:

1. That method of cooling and moistening gaseous fluids which comprises the steps of passing the fluid through a moistened material having the property of rapidly absorbing and slowly evaporating moisture, and maintaining said material continuously moistened while passing said fluid through it.

2. That method of cooling and moistening gaseous fluids which comprises the steps of passing the fluid through a moistened material of high porosity, such as pumice, silica gel, infusorial earth, activated coal, and the like, and maintaining said material continuously moistened while passing said fluid through it.

3. The method of cooling and moistening gaseous fluids which consists of passing the gaseous fluid through a highly porous moistened material and simultaneously supplying liquid to said material.

4. In an oxygen breathing apparatus, the combination with a source of oxygen supply of a cooling medium therefor consisting of a moistened material having the property of rapidly absorbing and slowly evaporating moisture.

5. A self-contained oxygen breathing apparatus comprising in combination, an oxygen evolving container, a respirator and mask, and a container charged with a moistened highly porous granular material, arranged to cool and moisten the air handled by the breathing apparatus.

6. Apparatus for treating gaseous fluids comprising, a plurality of containers connected in parallel relation to a plurality of conduits, valves controlling the flow of fluids through the respective containers, said containers being charged with a highly porous granular material having the property of rapidly absorbing and slowly evaporating moisture.

7. The method of cooling and drying air which consists of passing the air through a moistened highly porous granular material, and subsequently through a drying medium such as calcium chloride and the like.

8. Oxygen breathing apparatus comprising the combination of a mask, a revivifying and oxygen evolving container connected thereto, a cooling and moistening unit associated with the container, said unit including a water moistened body of highly porous granular material capable of rapidly absorbing and slowly evaporating moisture through which body the air to be cooled and moistened is passed.

9. Apparatus for cooling and moistening gaseous fluids including a container, a conduit extending to and connected to the container, a body of moistened granular material in the container selected from the class including pumice, silica gel, infusorial earth, and activated coal, a conduit connected to and extending from the other side of the container, and screens in the container preventing the granular material from working into the conduits, said screens being convex on their sides engaging with the granular material.

10. Apparatus for cooling and moistening gaseous fluids including a container, a conduit extending to and connected to the container, a body of moistened granular material in the container selected from the class including pumice, silica gel, infusorial earth, and activated coal, a conduit connected to and extending from the other side of the container, and screens in the container preventing the granular material from working into the conduits.

11. That method of cooling and moistening a gaseous fluid which comprises providing a body of material of high porosity selected from the class including pumice, silica gel, infusorial earth, activated coal, and the like, submerging the body in water, draining off the free water from the body and then passing the fluid through the body.

12. That method of cooling and moistening a gaseous fluid which comprises providing a body of material of high porosity selected from the class including pumice, silica gel, infusorial earth, activated coal, and the like, moistening the body with water, and passing the fluid through the body.

13. That method of cooling and moistening a gaseous fluid which comprises providing a body of material of high porosity selected from the class including pumice, silica gel, infusorial earth, activated coal, and the like, moistening the body, and passing the fluid through the body.

KURT A. GERSON.